United States Patent
Rubin

(10) Patent No.: US 11,064,723 B2
(45) Date of Patent: Jul. 20, 2021

(54) SIX-KINGDOM ORAL NUTRITIONAL SUPPLEMENT COMPOSITION

(71) Applicants: Ancient Brands, LLC, North Palm Beach, FL (US); Jordan Seth Rubin, Koshkonong, MO (US)

(72) Inventor: Jordan Seth Rubin, Koshkonong, MO (US)

(73) Assignee: Ancient Brands, LLC., Franklin, TN (US)

( * ) Notice: Subject to any disclaimer, the term of this patent is extended or adjusted under 35 U.S.C. 154(b) by 35 days.

(21) Appl. No.: 16/154,245

(22) Filed: Oct. 8, 2018

(65) Prior Publication Data

US 2019/0239550 A1 Aug. 8, 2019

Related U.S. Application Data

(63) Continuation of application No. 15/399,190, filed on Jan. 5, 2017, now abandoned.

(60) Provisional application No. 62/275,446, filed on Jan. 6, 2016.

(51) Int. Cl.
| | |
|---|---|
| *A23L 33/00* | (2016.01) |
| *A23L 29/275* | (2016.01) |
| *A23L 33/105* | (2016.01) |
| *A23L 33/135* | (2016.01) |
| *A23L 33/29* | (2016.01) |
| *A23L 33/175* | (2016.01) |

(52) U.S. Cl.
CPC ............ *A23L 33/40* (2016.08); *A23L 29/275* (2016.08); *A23L 33/105* (2016.08); *A23L 33/135* (2016.08); *A23L 33/175* (2016.08); *A23L 33/29* (2016.08); *A23V 2002/00* (2013.01)

(58) Field of Classification Search
CPC ...... A23L 33/40; A23L 29/275; A23L 33/175; A23L 33/105; A23L 33/135; A23L 33/29
USPC .................. 426/72, 615, 648, 656, 658, 601
See application file for complete search history.

(56) References Cited

U.S. PATENT DOCUMENTS

2011/0081335 A1 4/2011 Medoff
2013/0316041 A1* 11/2013 Maranz

* cited by examiner

*Primary Examiner* — Helen F Heggestad
(74) *Attorney, Agent, or Firm* — Barbara E. Johnson, Esq.

(57) ABSTRACT

The invention is a nutritional composition in unit dosage form for oral administration to an animal or human, which includes at least one ingredient from each of six biological Kingdoms selected from the group consisting of animals, plants, fungi, bacteria, protist and archaea. Each ingredient is co-admixed with every other said ingredient without further addition of synthetic excipients or fillers, and is typically formulated in dried powder form as a drink mix, food or beverage additive or as the fill for hard or soft capsules or other dosage forms including tablets (the compositions of the invention can generally be tableted without addition of ingredients beyond the nutrients themselves).

2 Claims, No Drawings

SIX-KINGDOM ORAL NUTRITIONAL SUPPLEMENT COMPOSITION

CROSS-REFERENCE TO RELATED APPLICATION

This nonprovisional patent application claims priority to, and incorporates herein by reference, U.S. Provisional Patent Application No. 62/275,446 filed 6 Jan. 2016. As the field of the invention, the present innovation pertains to nutritional supplements that have measurable preventive and therapeutic effects on the human body, with an explanation of how and why.

BACKGROUND OF THE INVENTION

Description of Related Art

It is not controversial to admit that, most if not all of the time, there are some tensions between allopathic or pharmaceutical treatment philosophies and the perspective of prevention and natural healing methods promoted within natural medicine. A current initiative in cancer drug development, for example, is to emphasize cancer treatment drugs because cancer preventives are now thought, pharmaceutically speaking, to be too elusive to chase. At the same time, the natural or integrative physician holds that the human body is capable of so much more than we currently understand, in healing and protecting itself, that the best nutritional boost is the one that helps the body do what it does, but better. From the natural health perspective, then, the body is able both to prevent and to fight disease and degeneration, if given the building blocks to do so. The natural health practitioner would seldom if ever seek a cure at the expense of a possible preventive, and instead prefers to remain open to the possibilities of both.

Happily, all camps understand and acknowledge the essential importance of comprehensive nutrition to wellness, whether disease prevention, recovery, or both. The challenge lies in grasping, ultimately, what comprehensive nutrition is, and how to implement it. Nutritional supplements of many sorts have gone in and out of vogue over the last several decades. Even if last month's protein shake or last week's spirulina smoothie feels a bit less cliché and obsolescent than, say, a synthetic multi-vitamin-and-mineral tablet from 1966, up until the present invention there has been a palpable sense among many nutritionists that the What and the Why of nutrition was still a bit of a mystery. Vitamins, minerals, certain probiotics, omega-3 fatty acids, co-enzyme Q10, glucosamine and chondroitin sulfate—many people know these terms and even remember to take these supplements regularly, and have a good understanding of why to do so. However, pockets of indigenous people in remote areas often experience stunningly good health compared to the developed world, and there has seldom been a thorough explanation as to how or why or common thread of nutritional practice linking these peoples together. The broader question therefore is—what should an adult man or woman consume, weekly if not daily, as the optimal nutritional supplement for maximized health maintenance, disease prevention and recovery? What is the scientific and verifiable extent of nutritional supplementation that makes a measurable difference in preventive and curative health, rather than continuing to guess and to experiment? If one knew the answer to these questions, one would hardly ignore the opportunity.

Accordingly, a need remains for a nutritional supplement regime—the ultimate nutritional initiative for men or women—that is safe, broad-spectrum, energy-creating, digestion stimulating and immunomodulating, all in ways that facilitate the human body's ability to prevent and fight diseases including infections and even cancer. Empirically, that first-developed synthetic vitamin-and-mineral tablet has not been able to achieve such an effect, and no one ever expected that it would. Is there, though, a nutritional supplement or system of supplementation that can optimally boost disease prevention and recovery in a broad way and, if so, what is it and how does it work?

SUMMARY OF THE INVENTION

In order to meet this need, the present broad-spectrum nutritional supplement system is a composition, for oral administration in unit dosage form, which essentially contains at least one unrefined or minimally refined (as long as rendered safe) ingredient from each of the six Kingdoms of biology, namely, animal, plant, fungi, bacteria, protist and archaea. (Everything is simple once you know it.) Candidates from each category are readily apparent to those skilled in the art, but knowing to combine a representative of each of the six categories in a single nutritional supplement, while maintaining the ingredients in an unrefined or minimally refined state while still rendered safe for consumption, is a key to the present invention and a novel initiative in nutritional supplementation.

There is nothing merely brute-force about selecting at least one agent from each of the six Kingdoms for combination in the present composition—that is, the invention is not a matter of "more-is-better." The applicant has determined that the six-Kingdom ingredient combination gives unexpectedly improved results over other nutritional supplements for the following reasons. If an agent from each Kingdom is present, not only will there be nutritional supplementation of virtually any category of nutrient (animal can provide certain omega-3 fatty acids, B-12 and preformed vitamin A; fungi supply vitamin D2, beta glucans and enzymes; sources of archaea provide organically bound minerals and organic acids; and so forth) but a heretofore unavailable synergy occurs when all six Kingdom agents are present. For example, the co-administration of probiotic bacteria and unrefined or minimally refined dietary sources of archaea, such as deep sea minerals, Shilajit, or clays, promote a greater growth and proliferation of the bacteria within the digestive tract. In other words, co-administration of naturally-occurring probiotics and mineral/organic acid combinations in the same composition assures gut flora balance in a way that administration of either alone cannot accomplish. Separately, the co-administration of a protist agent with an archaea containing ingredient will prolong the viability of the protist ingredient after ingestion in a manner roughly analogous to having enteric coated it, because the archaea chemically protects the protist life form or concomitant enzyme. Maybe most importantly, the broad-spectrum administration of six Kingdom nutrient species has an immunomodulating effect, that is, acts to avoid either the unwanted immune activation or immune suppression which inevitably do more harm than good when they occur abruptly.

Immunomodulation occurs, in the context of this invention, when the body as a whole is flooded with every conceivable life form and nutrient category and, quixotically, the body calms itself as a result of the onslaught and thus does not overreact to any of the individual stimuli while remaining flexible to act appropriately as to all immune-significant events. The present nutritional supplement composition can thus reduce allergies and asthma at the same time it boosts healthy (modulated) immune responses to insults of pathogens or poisons, just as the body is supposed to respond. The presence of representatives from all six Kingdom nutritional categories creates a further synergy in that the nutritive elements all help one another—the minerals help the vitamins help the probiotics and so forth. In summary, until the present invention it was difficult if not impossible to attain all of antibiotic effect in the gut, and allergy and asthma suppression, all while providing a comprehensive nutritional therapy for immunomodulation, energy enhancement, digestive- and circulatory-system improvement. While specific formulas are described below, with reference to ingredients from each of the six biological Kingdoms, the invention itself inheres in the new, useful and nonobvious combination of nutritional representatives from all six Kingdoms (importantly minimally refined or unrefined while still being rendered safe for human consumption as needed) and administered in a prepared composition for oral administration.

DETAILED DESCRIPTION OF THE INVENTION

In the context of the present invention, "broad spectrum" means "having multiple physiological effects on the immune system, metabolism, digestion and circulation." In other contexts, of course, broad-spectrum means something else. A broad-spectrum antibiotic would conventionally be understood to have antibiotic activity against a number of microorganisms. In the present invention, the focus of action is entirely different: the present nutritional supplement is broad-spectrum to act beneficially as to the immune system, metabolism, digestion and circulation precisely because it contains at least one ingredient from each of the six biological Kingdoms (animal, plant, fungi, bacteria, protist, and archaea) and can therefore by definition affect all possible biological function all at the same time due to its extremely broad array of macro and micronutrients, multi and single cellular microorganisms and their metabolites, and phytonutrients.

The present invention combines a nutritional ingredient (at least one, and possibly more than one) from each of the biological Kingdoms of animal, plant, fungi, bacteria, protist and archaea.

While the invention pertains to any nutritional supplement oral composition combining ingredients from each of the six Kingdoms, certain categories of nutrient types are preferred as follows.

ANIMAL: fish roe, fish oil, organ meats from land animals, dairy products and derivatives, fowl eggs, insects (including but not limited to crickets, grubs, termites, grasshoppers, pod borers, dragonflies, hawk moths, rice borers, caterpillars, cutworms, silkworms, bollworms, ants, beetles, water bugs, bees, wasps, yellow jackets, cicadas, stink bugs, weevils, katydids, locusts, scorpions, mantis and spiders—see for example "World List of Edible Insects 2015, Yde Jongema, Wageningen University).

PLANT: herbs, spices, sprouts, seeds, fruits, or vegetables.

FUNGI: mushrooms, fungal enzymes, vitamin and mineral rich yeasts, and amino acid rich yeasts.

BACTERIA: *Bacillus, Lactobacillus, Acetobacter*, and bacterial enzymes.

PROTIST: micro algae and macro algae including but not limited to red algae and spirulina; phytoplankton; mold-based enzymes.

ARCHAEA: deep sea minerals and sea salts; shilajit, and bentonite clay and other clays containing archaea.

Although the invention has been described above the following examples are illustrative.

Example 1

An oral nutritional supplement according to the invention is prepared as follows.

Each hard shell capsule contains 675 mg of the following raw materials in dried powder from each of the six Kingdoms.

Fish Roe: 200 mg
Turmeric Root: 200 mg
Reishi Mushroom: 100 mg
Spirulina: 100 mg
*Bacillus coagulans:* 50 mg
Deep Sea Salt: 25 mg Example 2

An oral nutritional supplement according to the invention is prepared as follows. Each hard shell capsule contains 675 mg of the following raw materials in dried powder from each of the six Kingdoms.

Venison Liver: 200 mg
Goji Berry: 200 mg
Lion's Mane Mushroom: 100 mg
Chlorella: 100 mg
*Lactobacillus salivarius:* 50 mg
Himalayan shilajit: 25 mg Example 3

An oral nutritional supplement according to the invention is prepared as follows. Each scoop of powder contains 2,000 mg of the following raw materials in dried powder from each of the six Kingdoms.

Whey Protein: 1,000 mg
Spinach: 200 mg
*Saccharomyces cerevisea* sbspp *boulardii:* 200 mg
Kelp: 200 mg
*Bacillus subtilis:* 200 mg
Montmorillionite Clay: 200 mg The present composition is specifically oral. Of course it is possible to supplement nutrients through parenteral, transdermal, buccal or many other routes of administration, but for the synergies asserted here to obtain the administration must be oral. For example, it is not possible to enhance gut flora directly, as the present composition does, unless the present supplement is actually ingested. While there may be benefits of administering representative nutrient sources from all six Kingdoms by some route of administration other than oral, for the purpose of the new and unexpected results of the present invention the administration must be by normal ingestion and therefore the invention is an oral dosage form. From the standpoint of a legitimate superfood, also, the present composition does not contain any synthetic additives or excipients other than the nutritional ingredients themselves. The absence of synthetic excipients or fillers enhances the ability of the six (or more) ingredients to create novel synergies. Having said that, however, those skilled in the art will understand that "one man's filler is another man's nutrient." For example, if carageenan is desired for use in the present invention, as a polysaccharide derived from red algae and for its nutritional purpose, it will be an active agent in this formulation even though, say, in a commercial ice cream it might be considered a thickener or additive. Ultimately, the point of every ingredient in the present invention is its nutritional profile, and because all six biological Kingdoms are represented as a practical matter the formulation of the admixed ingredients into capsules, tablets, powders or ready to drink beverages is straightforward. In other words, by using all six biological Kingdom ingredient representatives, an eminently compoundable admixture results that needs no further additives.

Whereas particular embodiments of this invention have been described above for purposes of illustration, it will be evident to those skilled in the art that numerous variations of the details of the present invention may be made without departing from the invention as defined in the appended claims.

The invention claimed is:

1. A method of supplementing nutrition in an animal or human, consisting essentially of administering, in unit dosage form, a combination of an aliquot of each of six constituents each consisting of an unrefined dried powdered substance from each of six biological kingdoms consisting of animal, plant, fungi, bacteria, protist and archaea, wherein prior to administration each of said six constituents said combination is admixed together without addition of separate excipients or fillers, further wherein after said six constituents are admixed together, said six constituents are comminuted into a reconstitutable powder, and further wherein said six constituents are fish roe, turmeric root, reishi mushroom, spirulina, *Bacillus coagulans*, and deep sea salt.

2. A method of supplementing nutrition in an animal or human, consisting essentially of administering, in unit dosage form, a combination of an aliquot of each of six constituents each consisting of an unrefined dried powdered substance from each of six biological kingdoms consisting of animal, plant, fungi, bacteria, protist and archaea, wherein prior to administration each of said six constituents said combination is admixed together without addition of separate excipients or fillers, further wherein after said six constituents are admixed together, said six constituents are comminuted into a reconstitutable powder, and further wherein said six constituents are venison liver, goji berry, lion's mane mushroom, chlorella, *Lactobacillus salivarius* and Himalayan shilajit.

* * * * *